June 1, 1948.  J. PEARLMAN  2,442,549

MERCHANDISE HANDLING APPARATUS

Filed March 18, 1946  9 Sheets-Sheet 1

INVENTOR.
JACK PEARLMAN
BY
ATTORNEY

June 1, 1948.     J. PEARLMAN     2,442,549
MERCHANDISE HANDLING APPARATUS Filed March 18, 1946     9 Sheets-Sheet 2

INVENTOR.
JACK PEARLMAN
BY
ATTORNEY

June 1, 1948. J. PEARLMAN 2,442,549
MERCHANDISE HANDLING APPARATUS
Filed March 18, 1946 9 Sheets-Sheet 5

INVENTOR.
JACK PEARLMAN
BY Edwin Leisohn
ATTORNEY

INVENTOR.
JACK PEARLMAN

June 1, 1948.                    J. PEARLMAN                    2,442,549
                          MERCHANDISE HANDLING APPARATUS
Filed March 18, 1946                                          9 Sheets-Sheet 7

INVENTOR.
JACK PEARLMAN
BY Edwin Leisohn
ATTORNEY

June 1, 1948. J. PEARLMAN 2,442,549
MERCHANDISE HANDLING APPARATUS
Filed March 18, 1946 9 Sheets-Sheet 8

INVENTOR.
JACK PEARLMAN
BY Edwin Leinsohn
ATTORNEY

June 1, 1948.  J. PEARLMAN  2,442,549
MERCHANDISE HANDLING APPARATUS
Filed March 18, 1946  9 Sheets-Sheet 9

INVENTOR.
JACK PEARLMAN
BY Edwin Lewisohn
ATTORNEY

Patented June 1, 1948

2,442,549

UNITED STATES PATENT OFFICE 2,442,549

MERCHANDISE HANDLING APPARATUS

Jack Pearlman, Kew Garden Hills,
Long Island, N. Y.

Application March 18, 1946, Serial No. 655,240

19 Claims. (Cl. 214—65)

1

This invention relates to merchandise handling equipment on transport vehicles such as automotive trucks, and more particularly to equipment of this type for handling special packing cases which hold the merchandise to be shipped.

Equipment of this general type is disclosed in my prior Patent No. 2,235,727, dated March 18, 1941, and comprises substantially horizontal tracks or rails in an automotive truck on which special packing cases or containers are suspended during transportation. The packing cases are provided with casters on which they may be wheeled on a floor or on the ground, and are further provided with rollers by which they may be suspended on the tracks in the truck. To load the truck from a platform, the packing cases are wheeled from the platform onto a horizontal tail gate on the truck on which they are at the proper level to enter the tracks directly with their rollers. To unload the packing cases from the truck onto a platform, they are rolled off the tracks onto the tail gate, and then wheeled onto the platform. The truck also carries a hoist for loading the truck from the ground, the hoist serving to lift one packing case at a time from the ground and place it with its rollers on the tracks, after the hinged tail gate has first been swung out of the way. To unload packing cases from the truck onto the ground, the hoist is used to lift each packing case clear of the tracks and then lower it to the ground. To this end, the tracks are made up of sections, of which those adjacent the hoist are demountable to permit the passage of a packing case on the hoist to and from the tracks, and remountable for lowering a lifted packing case thereon.

The present invention is an improvement upon the loading and unloading equipment disclosed in my above-mentioned prior patent, and has for its main object the provision in a transport vehicle of equipment for loading special packing cases of the above type from the ground or from a platform onto suspension tracks in the vehicle, and for unloading packing cases from the suspension tracks in the vehicle onto the ground or onto a platform, without using a hoist and without demounting and remounting any track sections.

It is a more particular object of the present invention to devise equipment of this type which loads and unloads packing cases to the exclusion of any manual handling of the same, except that an operator is required to wheel the packing cases on the ground or on a platform to and from the equipment.

It is another object of the present invention to design the equipment so that it may load or unload one or several packing cases at one time.

It is another object of the present invention to provide for power operation of the equipment, and to install operating controls therefor in the vehicle at a place where the operator may supervise the loading or unloading of the vehicle, yet be safely away from the packing cases as they are being loaded or unloaded.

The above and other objects of this invention will more fully appear from the following description, made in connection with the accompanying drawings, in which.

Figure 5:
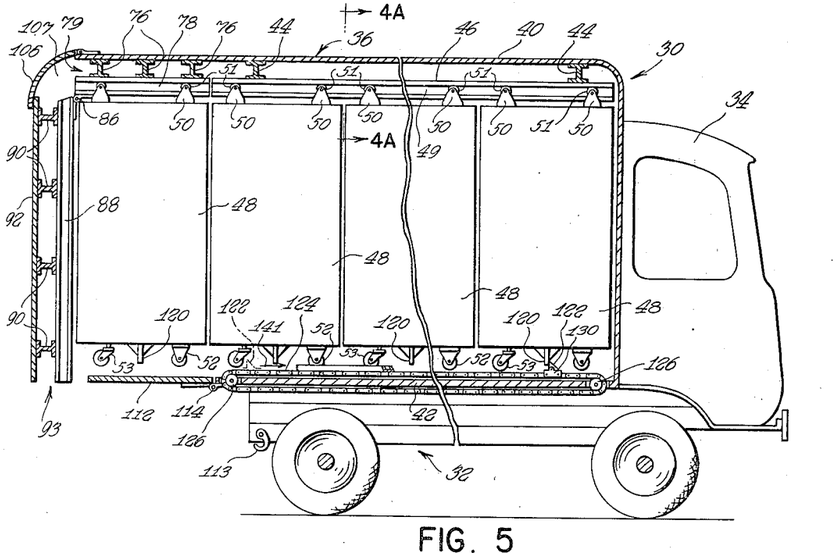
Fig. 5 is a longitudinal section through the vehicle, taken on the line 5—5 of Fig. 4.
Figure 6:
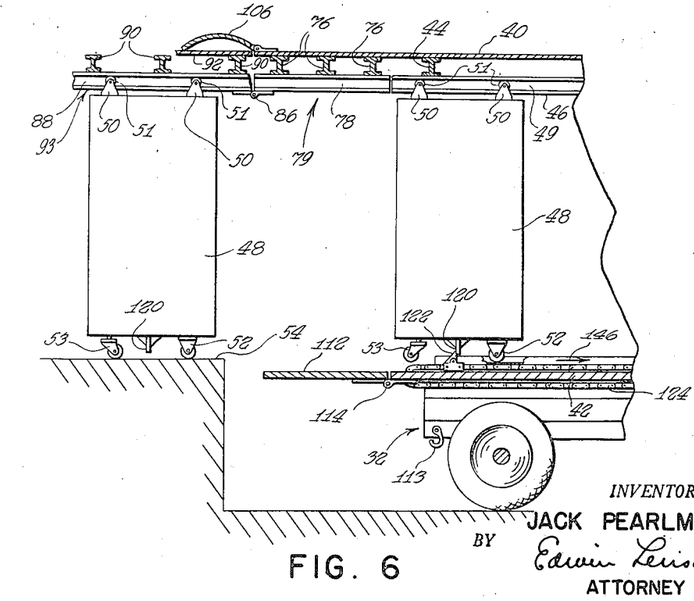
Figs. 6 and 7 are fragmentary, longitudinal sections through the vehicle, showing the loading and unloading equipment in different positions of operation.

Referring to the drawings, and particularly to Figs. 1 to 9 thereof, the reference numeral 30 designates a vehicle which, in the present instance, is an automotive truck having the customary wheeled chassis 32 which carries the cab 34 and the truck body 36. The truck body 36 is preferably of the enclosed type, and comprises side walls 38, a top or ceiling 40 and a bottom or floor 42. Suitably mounted on the ceiling 40 of the truck body are transverse rails 44 (Figs. 4A, 5, 6 and 7) from which a plurality of substantially horizontal, parallel tracks 46 are suitably suspended. The tracks 46 extend longitudinally of the truck body, and are preferably of the cross-sectional shape shown in Fig. 4A. In the present instance, there are provided two pairs of tracks 46, each pair being adapted to hold a longitudinal row of packing cases or containers 48 suspended in the truck body. To this end, the packing cases 48 are provided at the top with spaced brackets 50, carrying rollers 51 which ride in the outer channels 49 of either pair of tracks 46 (Fig. 4A) and by which the packing cases are held suspended from the tracks 46. The packing cases 48 are preferably also provided at the bottom with wheels 52 and casters 53 on which to wheel them on the ground (Fig. 7) or on a platform (Fig. 6). Mounted on the floor 42 of the truck body are two pairs of parallel channels 56 (Figs. 4 and 8), receiving the wheels 52 and casters 53 of the suspended packing cases 48 in the truck body.

The packing cases 48, which may be of any suitable construction, are adapted to be packed with merchandise at the factory or a distributing center before being loaded on the truck, and to be left by the truck driver with the consignee for unpacking. Hence, the truck driver need not handle the merchandise in any way, wherefore shipment of the same from one place to another requires a minimum of time.

Mounted in top and bottom rails 58 on each side of the truck body are the ends of vertical guide rods or bars 60 (Figs. 1 to 4 and 9), which slidably receive bosses 62 of a bracket 64 (Figs. 1 to 4). For additional vertical guidance of the brackets 64, each carries a wheel 72 which rides in a vertical channel bar 74, suitably mounted on the top and bottom rails 58 (see also Fig. 9). More particularly, each wheel 72 is mounted on a carrier 68 which is, in turn, adjustably mounted on a laterally projecting ear 66 of a bracket 64 by means of a screw stud 70 and nuts 71 (see also Fig. 21). Mounted on top of the brackets 64 are spaced transverse rails 76 (Figs. 4 to 6) from which track sections 78 are suitably suspended. The brackets 64, rails 76 and track sections 78 form an elevator 79 (Fig. 4) which is vertically movable on the guide rods 60. The track sections 78 are of the same cross-sectional shape as the track 46, and form extensions or continuations of the latter when the elevator is in its uppermost position (Figs. 5 and 6).

Suitably journalled in the top and bottom rails 58 on each side of the truck body are the ends of a vertical feed screw 80 (Figs. 1 to 4 and 9) which extends through, and is threadedly received by, the adjacent bracket 64 of the elevator 79. The threads of the screws 88 are preferably of the same pitch so that, on simultaneously rotating them at the same speed, the elevator 79 is raised or lowered, depending on the direction of rotation of the screws 80.

Figure 1:
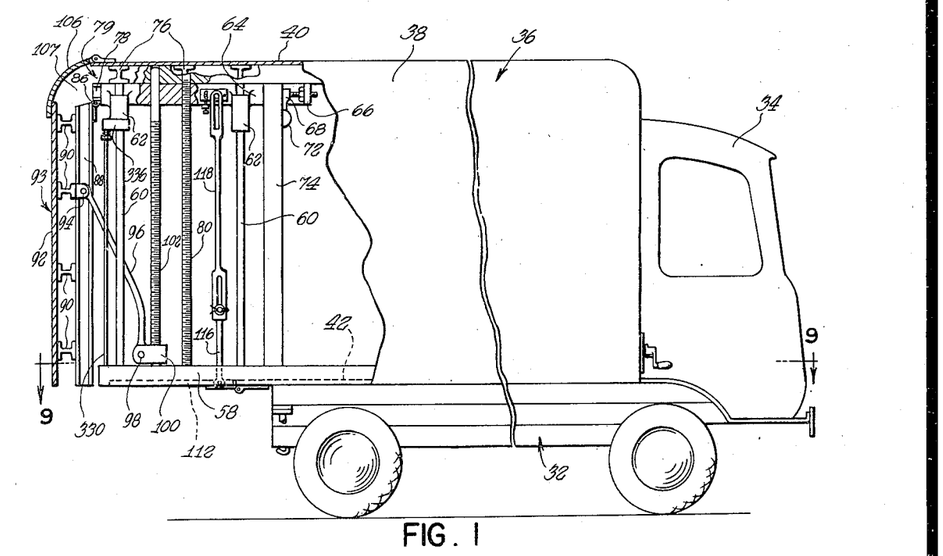
Fig. 1 is a side elevation, partly in section, of an automotive vehicle having loading and unloading equipment which embodies the present invention.
Figure 2:
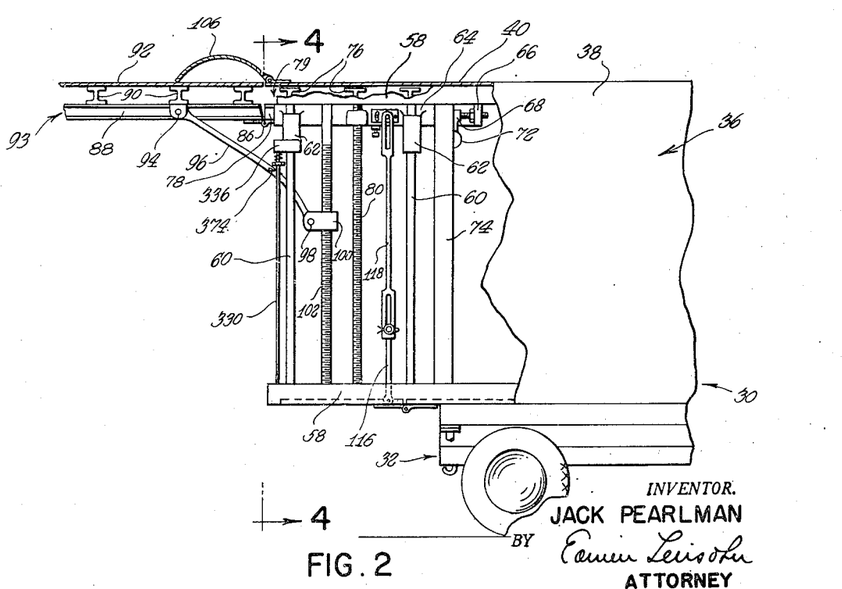
Figs. 2 and 3 are fragmentary side elevations, partly in section, of the vehicle, showing the loading and unloading equipment in different positions of operation.

Hinged at 86 to the rear end of each track section 78 of the elevator 79 is another track section 88 of the same cross-sectional shape as the track sections 78 and tracks 46 (Figs. 1, 2, 3, 5 and 6). Extending transversely of the track sections 88, and mounted thereon, are rails 90 to which a back door 92 is suitably secured. The track sections 88, rails 90, and the back door 92 form a track extension unit 93 (Figs. 1 to 3, 5 and 6). The outer track sections 88 of the unit 93 are pivotally connected at 94 with links 96 (Fig. 3), which are also pivotally connected at 98 with travelers 100, threadedly received on vertical feed screws 102 which are suitably journalled with their ends in the top and bottom rails 58 on the opposite sides of the truck body. The threads of the screws 102 are preferably of the same pitch as the threads of the screws 80. When the elevator 79 is in its uppermost position (Figs. 1 and 2) the track extension unit 93 may be swung open (Fig. 2) or closed (Fig. 1), by simultaneously rotating the screws 102 in the proper directions, as will be readily understood. When the track extension unit 93 is open as shown in Fig. 2, the track sections 88 are in linear alignment with the track sections 78 (Fig. 6). When the track extension unit 93 is closed (Fig. 1), the rear end of the truck body is closed by the door 92.

The elevator 79 and the track extension unit 93 may be lowered or raised in unison by simultaneously rotating the screws 80 and 102 in the proper directions. To permit this however, the track extension unit 93 must be in its open position (Fig. 2) so that the travelers 100 may descend on their screws 102.

The screws 80 and 102 are operated by power, and their operation is under the control of the operator of the truck, as will be described hereinafter.

To prevent rain or snow from entering the interior of the truck body when the back door 92 is closed (Figs. 1 and 5), a hinged cover 106 covers the gap 107 between the back door 92 and the top 40 of the truck body. When the track extension unit 93 is opened, the cover 106 merely slides on the back door 92 into the position shown in Fig. 2, ready to gravitate into the closing position shown in Fig. 1 when the track extension unit 93 is closed.

Figures 3, 4, 4A:
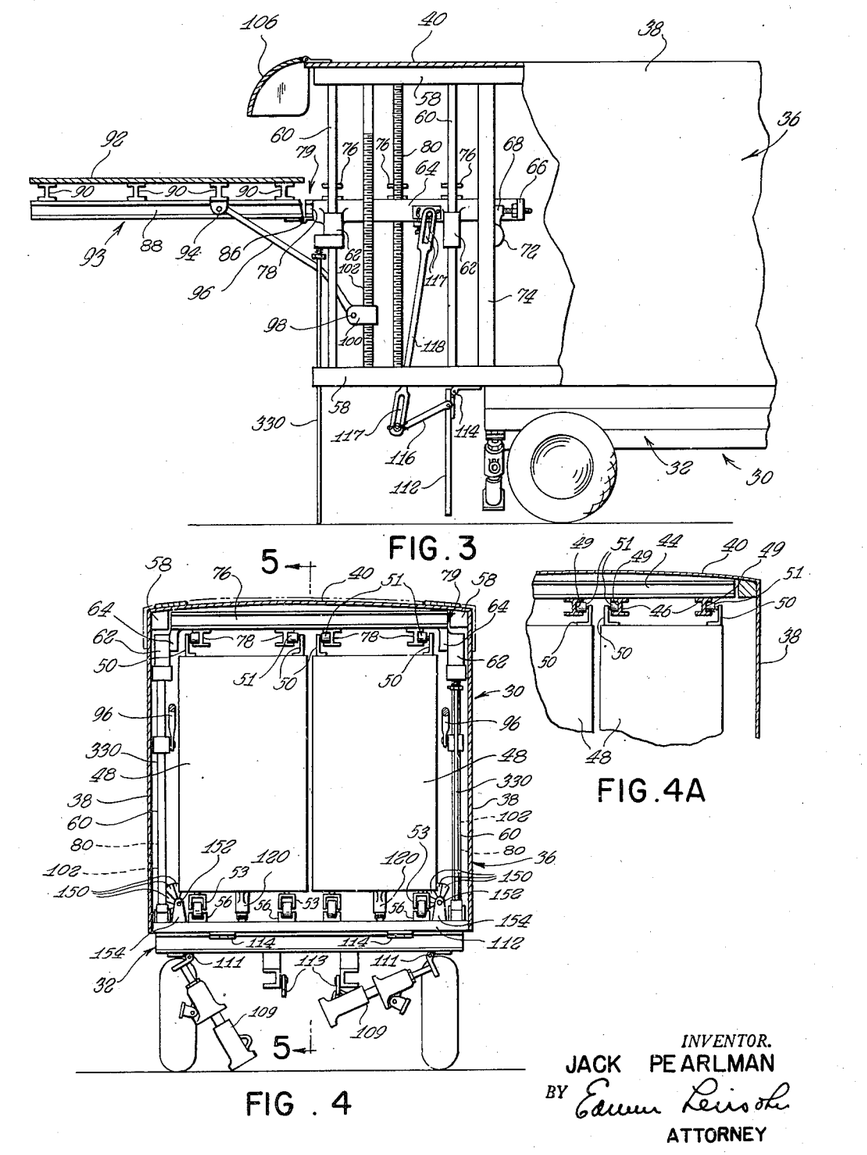
Fig. 4 is a transverse section through the vehicle, taken on the line 4—4 of Fig. 2.
Fig. 4A is a fragmentary transverse section through the vehicle, taken on the line 4A—4A of Fig. 5.

The floor 42 of the truck body ends adjacent the outer ends of the tracks 46 (Fig. 5), and has hinged thereto at 114 a tail gate 112 (Figs. 3 to 9) which serves to close the truck body from the bottom. The tail gate 112 carries a pivoted arm 116 on each side which is connected by a link 118 with the elevator 79 (Figs. 2 and 3), so that the tail gate is closed when the elevator 79 is in its uppermost position (Fig. 2), and is opened when the elevator 79 is lowered (Fig. 3). The connections of the links 118 with the elevator 79 and the arms 116 on the tail gate 112 are of the pin and slot type shown at 117, to permit further lowering of the elevator 79 after the tail gate is open (Fig. 3).

To load the truck from a platform 54 (Fig. 6), the same is backed up against the platform and the track extension unit 93 is opened. One after another of the packing cases 48 is then wheeled on the platform toward the adjacent ends of the aligned tracks 88, 78, 46, so that their rollers 51 enter said tracks. The packing cases are thereupon rolled on these tracks into the interior of the truck body until the truck is fully loaded. For maximum loading capacity, packing cases may also be held suspended on the track sections 78 of the elevator 79 (Fig. 5), without interfering with the closing of the back door 92 of the truck.

To unload the packing cases from the truck onto the platform 54, the truck is, as in loading, backed up against the platform and the track extension unit 93 is opened (Fig. 6), whereupon the suspended packing cases in the truck body are rolled off the tracks 46, 78, 88 and upon the platform 54, where they are wheeled away.

In the present instance, the platform 54 is on such a level that the packing cases 48 may directly enter the aligned tracks 88, 78 and 46 with their rollers 51 when they are wheeled on the platform. The same may be accomplished if the platform is on a higher level, by raising the rear end of the truck by means of hand-operated, preferably hydraulic, jacks 109 (Fig. 4), which are hinged at 111 to the chassis 32, and normally held in retracted or inoperative position by pivoted hooks 113 on the chassis.

Figure 7:
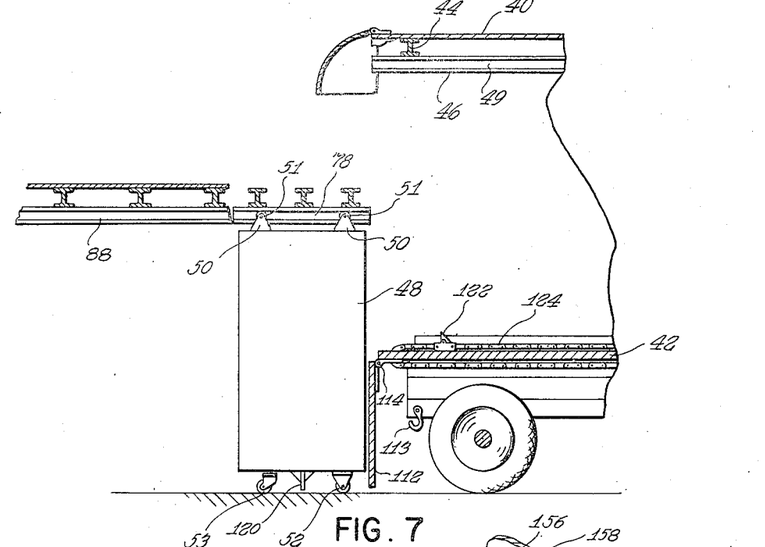

For loading the truck from the ground, the track extension unit 93 is opened (Fig. 2), whereupon the elevator 79 and the track extension unit 93 are lowered as a unit to the level of the rollers 51 of the packing cases on the ground, so that these rollers 51 may directly enter the aligned track sections 88, 78 when the packing cases are wheeled on the ground (Figs. 3 and 7). As many packing cases 48 may thus be placed on the lowered track sections 88, 78 as they will hold, whereupon the loaded elevator 79 and track extension unit 93 are raised to their uppermost position in which the track sections 88, 78 are in alignment with the tracks 46 in the track body. The raised packing cases are thereupon rolled off the track sections 88, 78 and onto the tracks 46 in the truck body. This procedure is repeated until the truck is fully loaded with packing cases (Fig. 5), whereupon the track extension unit 93 is closed.

For unloading packing cases 48 from the truck onto the ground, the track extension unit 93 is opened, and as many cases 48 are rolled off the tracks 46 and onto the aligned track sections 78, 88 as the latter will hold. The elevator 79 and the track extension unit 93 are then lowered as a unit until the cases 48 thereon rest on the ground (Fig. 7), whereupon they are wheeled on the ground clear of the track sections 78, 88. The elevator 79 and the track extension unit 93 are then raised to their uppermost position, whereupon the same procedure is repeated until the truck is completely unloaded.

Each packing case 48 carries at its bottom a downwardly extending pusher plate 120 (Figs. 4 to 7), adapted to cooperate with a lug 122 on either one of two endless conveyor chains 124 (Figs. 5, 8 and 9) when the packing case is suspended in the truck. The chains 124 are passed over sprockets 126 suitably journalled in the floor 42 of the truck body. The chain conveyors 124 are power-operated in either direction at the will of the operator of the truck, as will be described more fully hereinafter, and they serve to roll packing cases 48 on the tracks 46 in either direction. To this end, each lug 122 is pivotally mounted at 128 on a special link 130 of its conveyor chain 124 (see particularly Figs. 22 and 22A, so that the lug may be rocked from the full line position into the dot-and-dash line position shown in Fig. 22, and vice versa. When in the full line position, the edge 132 of the lug 122 is positioned to roll a packing case on the suspension tracks 46 in the direction of the arrow 129 in Fig. 22. When the lug 122 is in the dot-and-dash line position (Fig. 22), its edge 134 is positioned to roll a packing case on the tracks 46 in the opposite direction.

Figures 18, 19, 20, 21, 22, 22A, 23:
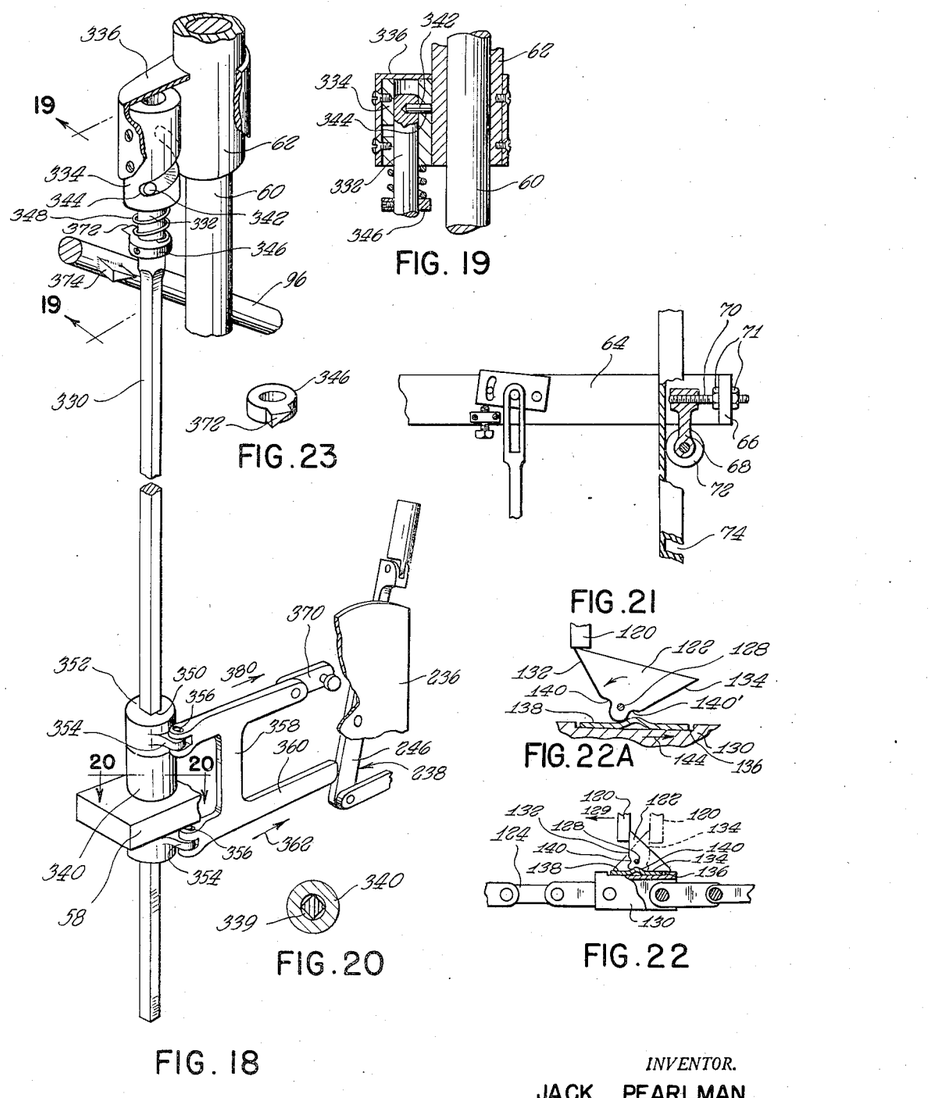
Fig. 18 is a fragmentary, perspective view of certain control mechanism on the vehicle.
Fig. 19 is a fragmentary section taken on the line 19—19 of Fig. 18.
Fig. 20 is a section taken on the line 20—20 of Fig. 18.
Fig. 21 is a fragmentary side elevation, partly in section, of certain elements of the loading and unloading equipment on the vehicle.
Fig. 22 is a side-elevational view of part of a chain conveyor in the vehicle.
Fig. 22A is a view similar to Fig. 22, showing the chain conveyor in a different operation.
Fig. 23 is a perspective view of a detail of the control mechanism shown in Fig. 18.

Located in a recess 136 in the link 130 of each conveyor chain 124 is a latch spring 138 which cooperates with either one of the depressions 140 in the edges 132 and 134 of the adjacent lug 122, and serves yieldingly to arrest the latter in either the full line position or the dot-and-dash line position shown in Fig. 22. The depressions 140 in each lug 122 and the adjacent latch spring 138 are so arranged that the latch spring will return the lug to either of its operating positions from which it has been rocked to a limited extent. This is clearly illustrated in Fig. 22A, for instance, in which the depression 140′ in the lug 122 continues to impinge on the latch spring 138 even when said lug, during movement in the direction of the arrow 144 (Fig. 22A), yields from the full line position shown in Fig. 22 and rides under a pusher plate 120 of a suspended packing case in the truck body (Fig. 22A), and the latch spring will return the lug to its original full line position (Fig. 22) when the same has cleared the pusher plate 120.

The ability of the lugs 122 of the conveyor chains 124 to yield and ride under the pusher plates 120 on the suspended packing cases in the truck body under certain conditions, is of considerable advantage in loading and unloading the truck. Thus, the chain conveyors 124 may, after each loading or unloading operation, be conveniently stopped when their lugs 122 are near the tail gate 112 within easy reach of the operator. For the next unloading of the truck, the operator simply sets the lugs 122 for unloading (see dot-and-dash line position in Fig. 5) and runs the chain conveyors in the direction of the arrow 141 in Fig. 5, whereby the lugs 122 ride under the pusher plates 120 on the suspended packing cases in the truck. The operator will stop the chain conveyors 124 when their lugs 122 have cleared the requisite number of packing cases to be unloaded from the truck at one time (a limited number when unloading them on the ground, and possibly all when unloading them on a platform). The chain conveyors 124 are then operated in the reverse direction, whereby the lugs 122 engage the pusher plates 120 of the nearest packing cases and push the same and the ones in front of them out of the truck.

For loading the truck, the operator sets the lugs 122 correspondingly (Fig. 6). As the packing cases 48 are rolled off the aligned track sections 88, 78 and onto the fixed tracks 46 in the truck body, the conveyor lugs 122 simply slide under the pusher plates 120 of these cases as they pass. The operator next runs the conveyor chains in the direction of the arrow 146 in Fig. 6, whereby the lugs 122 roll the packing cases on the tracks 46 deeper into the body of the truck. The conveyor chains are then run in the reverse direction, and stopped when the lugs 122 thereof are near the tail gate 122. The operator repeats this procedure until the truck is loaded within the operating region of the chain conveyors 124, i. e., until the fixed tracks 46 are loaded to capaciy. It is now apparent that the lugs 122 are normally near the tail gate 112 of the truck when the chain conveyors 124 are stopped after loading or unloading the truck, so that the operator may easily reach these lugs and set them for the next loading or unloading operation.

Figure 8:
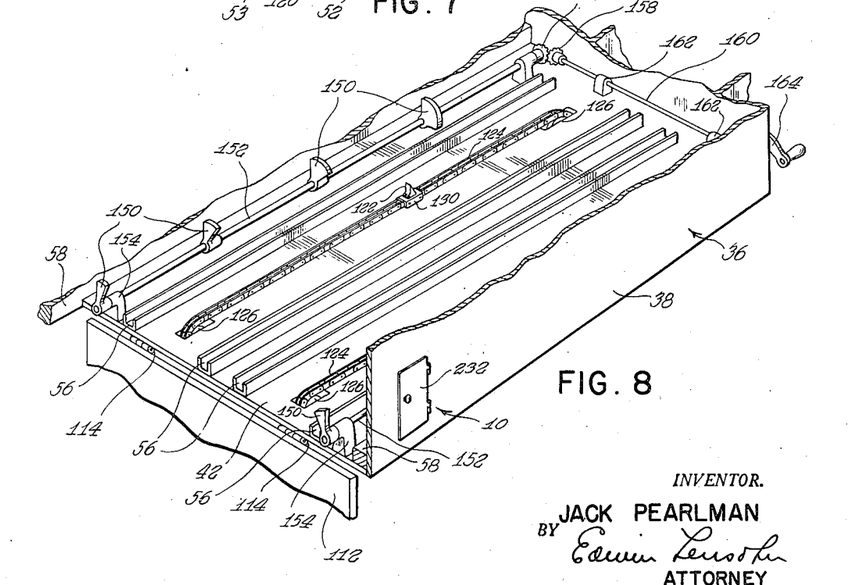
Fig. 8 is a perspective view of the body of the vehicle, partly broken away for better illustration of the floor thereof.
Figure 9:
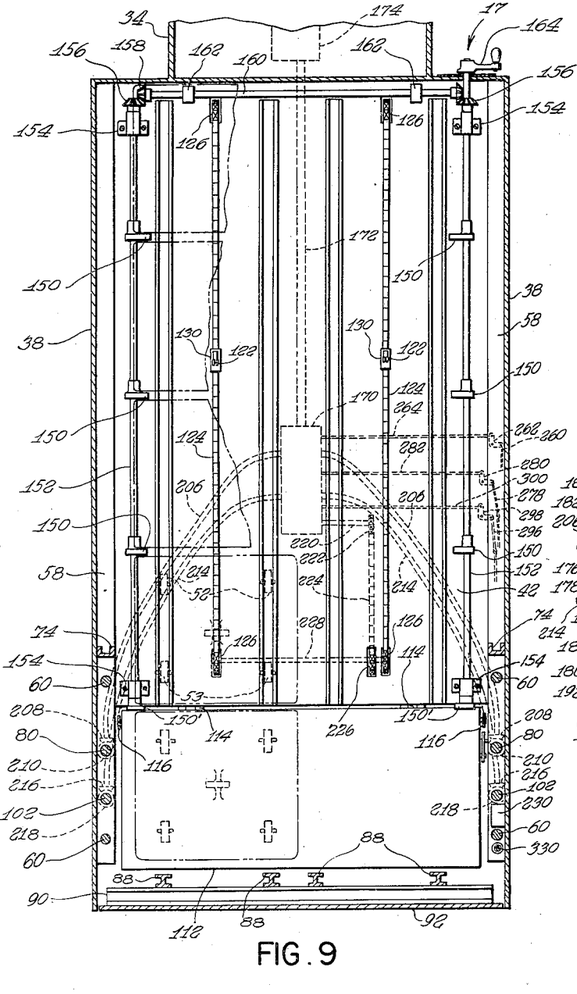
Fig. 9 is a horizontal section through the vehicle, taken on the line 9—9 of Fig. 1.

The packing cases 48 in the truck are individually held against rolling off the suspension tracks 46 and 78, by means of stops 150 (Figs. 4, 8 and 9). The stops 150 are arranged in identical sets on opposite sides of the truck, each set being adapted to arrest a longitudinal row of packing cases in the truck. The stops 150 of each set are mounted on a horizontal shaft 152, journalled in bearing brackets 154 on the floor 42 of the truck body. The shafts 152 are geared for simultaneous rotation. To this end, each shaft 152 carries a bevel gear 156 (Fig. 9) which is in permanent mesh with a bevel gear 158 on a transverse shaft 160, journalled in bearing brackets 162 on the floor 42 of the truck body. One of the shafts 152 extends outside the truck body and carries a crank 164 for manipulation by the operator of the truck (see also Fig. 17). When the operator turns the crank 164, the shafts 152 with their stops 150 are turned equal amounts in opposite directions. The stops 150 are arranged on their shafts 152 like stepped cams which successively release the packing cases of each row in the truck, starting from the rear end of the truck, when the crank 164 is turned clockwise as viewed in Fig. 17.

Figure 17:
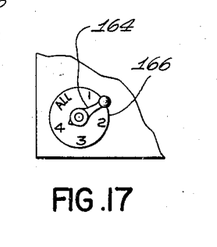
Fig. 17 is a fragmentary front elevation of certain operating mechanism on the vehicle as viewed in the direction of the arrow 17 in Fig. 9.

To facilitate the setting of the crank 164 by the operator for the release of any desired number of packing cases in the two rows, a dial 166 is coordinated with the crank 164 (Fig. 17). Thus, when the operator turns the crank 164 to the figure "1" on the dial, the stops 150' (Fig. 9) are in a position to release the rearmost packing cases 48 in the truck, while the remaining stops 150 are in a position to arrest the remaining packing cases in the truck. Thus, any desired number of packing cases 48 may be released, by simply turning the crank 164 to the corresponding figure on the dial 166. In the present instance, the truck has, within the operating region of the stops 150, a maximum capacity of four packing cases in each row, or eight packing cases in all. Hence, when the operator turns the crank 164 to the figure "4" on the dial 166, all the packing cases in the truck are released. When loading the truck or when unloading packing cases therefrom in one operation, the crank 164 is conveniently turned to the legend "All," in which position of the crank all the stops are also out of the path of movement of the suspended packing cases on the tracks 46.

Figure 9A:
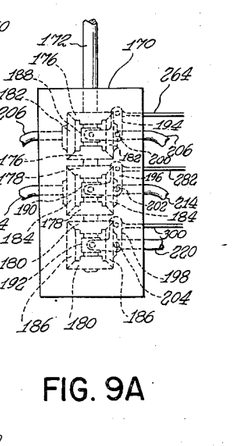
Fig. 9A is a diagrammatic illustration of certain operating mechanism of the vehicle.

As previously mentioned, the screws 80 and 102, which operate the elevator 79 and the track extension unit 93, respectively, are power-operated. To this end, there is provided a clutch housing 170 underneath the floor 42 of the truck body (Figs. 9 and 9A). Extending into the clutch housing 170 is a power shaft 172 which extends rearwardly from the conventional transmission 174 of the truck. The shaft 172 is so geared in the transmission 174 that the same is driven in one direction, when the engine of the truck runs and the transmission is in neutral position. Freely rotatable, but axially immovable, on the shaft 172 within the clutch housing 170 are pairs of spaced bevel gears 176, 178 and 180 (Fig. 9A). Permanently meshing with the bevel gears 176, 178 and 180 are other pairs of bevel gears 182, 184, 186, respectively. Rotatable with, and axially slidable on, the shaft 172 are clutch elements 188, 190 and 192 which are adapted to cooperate with clutch portions (not shown) on their associated bevel gears 176, 178 and 180, respectively. To shift the clutch elements 188, 190 and 192 into clutching engagement with either one of their associated bevel gears, shift levers 194, 196 and 198 are provided which are pivotally mounted in the clutch housing 170 at 200, 202 and 204, respectively.

Drivingly connected with each bevel gear 182 is a flexible shaft 206, which extends rearwardly beneath the floor 42 of the truck body and drives a bevel gear 208 (Fig. 9), which is in permanent mesh with a bevel gear 210 on the lower end of each screw 80. Hence, on shifting the driving clutch element 188 into clutching engagement with either one of its associated bevel gears 176 (Fig. 9A) the elevator 79 is raised or lowered, depending on which one of the gears 176 is engaged by said clutch element 188.

Drivingly connected with each bevel gear 184 (Fig. 9A) is a flexible shaft 214 which drives a bevel gear 216 (Figs. 9 and 14) that is in permanent mesh with a bevel gear 218 on the lower end of each screw 102. Hence, on shifting the driving clutch element 190 into clutching engagement with either one of its associated bevel gears 178 (Fig. 9A), the track extension unit 93 is closed or opened, respectively lowered or raised together with the elevator 79, depending on which one of the bevel gears 178 is engaged by the clutch element 190.

As previously mentioned, the chain conveyors 124 are also power-operated. To this end, one of the bevel gears 186 (Fig. 9A) is mounted on a stub shaft 220 which carries a sprocket 222 (Fig. 9) on which a driving chain 224 is mounted. The driving chain 224 is also mounted on another sprocket 226 on a shaft 228 on which the rear sprockets 126 of the chain conveyors 124 are mounted. Hence, on shifting the driving clutch element 192 into engagement with either one of its associated bevel gears 180 (Fig. 9A), the chain conveyors 124 are power-driven in either direction, depending on which one of the bevel gears 180 is engaged by the driving clutch element 192.

Centralized, manual controls are provided by means of which the operator of the truck may shift the driving clutch elements 188, 190 and 192 into clutching engagement with either one of their associated bevel gears 176, 178 and 180, respectively. These controls are housed in a box 230 in one of the side walls 38 of the truck body. The control box 230 is accessible from the outside of the truck, and is usually closed by a hinged cover 232 (Figs. 8 to 16). Secured at 234 in the control box 230 is a mounted plate 236 (Fig. 16) for the controls. These controls are in form of levers 238, 240 and 242, which are pivotally mounted on the mounting plate 236 (Figs. 10 to 15).

Figures 12, 12A, 13:
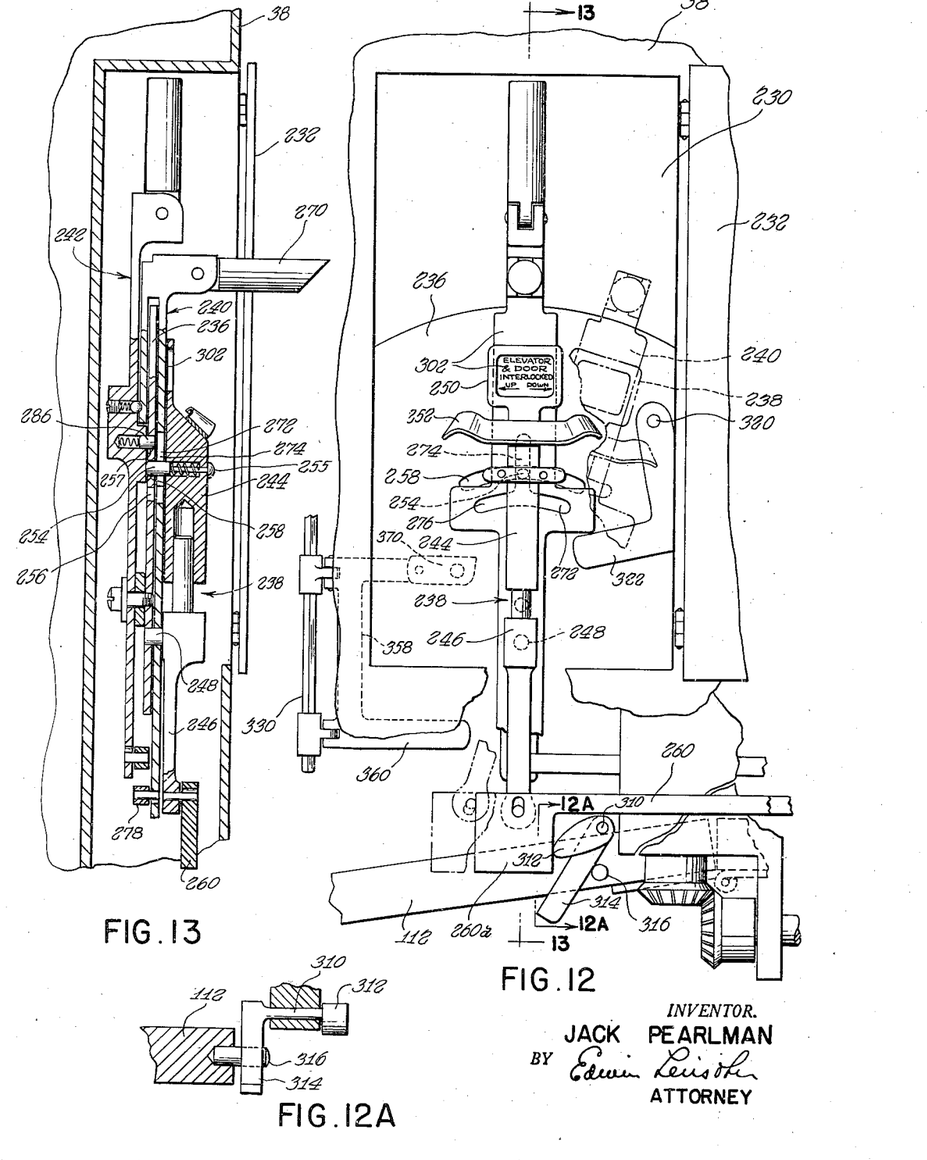
Fig. 12 is a view similar to Fig. 10, showing the control apparatus in a different operating position.
Fig. 12A is a fragmentary section, taken on the line 12A—12A of Fig. 12.
Fig. 13 is a section taken on the line 13—13 of Fig. 12.
Figures 14, 15, 16:
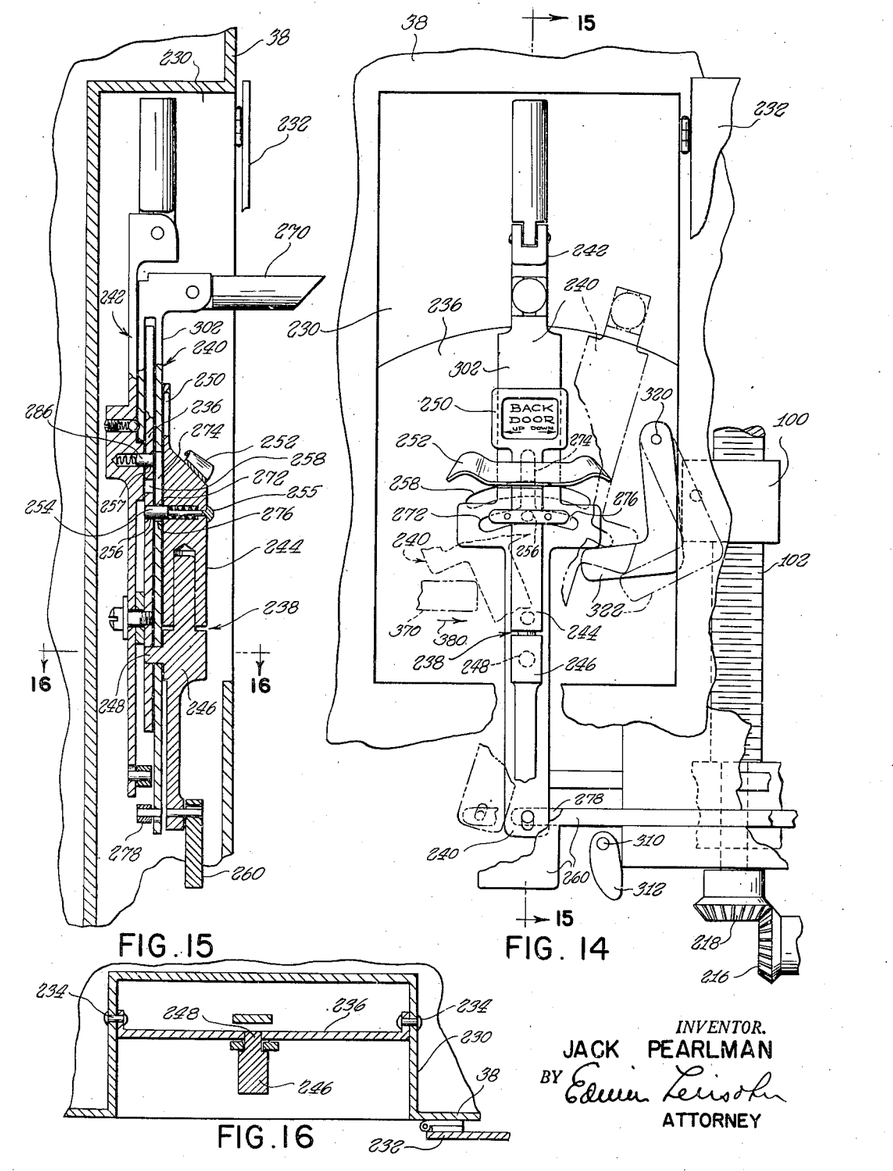
Fig. 14 is another view similar to Fig. 10, showing the control apparatus in another operating position.
Fig. 15 is a section taken on the line 15—15 of Fig. 14.
Fig. 16 is a transverse section through the control box, taken on the line 16—16 of Fig. 15.

The control lever 238 consists of two telescoping sections 244 and 246 of which the latter is pivotally mounted by a stud 248 on the mounting plate 236 (Figs. 12, 13 and 16). The upper section 244 of the control lever 238 is provided with a window frame 250, and carries a handle 252 with which to extend or contract the telescopic lever 238. The upper section 244 further carries a spring-urged plunger 254 which is adapted to project into either hole 256 or 257, or into an arcuate slot 258, in the mounting plate 236. The slot 258 is circular about the axis of the pivot stud 248, so that the lever 238 may be rocked when the plunger 254 projects into said slot (Figs. 12 and 13). The lower section 246 of the control lever 238 is connected by a link 260 with one arm of a pivotally mounted bell-crank lever 262 (Fig. 9), the other arm of which is connected by a link 264 with the shift lever 194 (Fig. 9A). Hence, on rocking the control lever 238, in a manner described hereinafter, from the neutral or inoperative position shown in full lines in Fig. 12, the driving clutch element 188 is shifted into engagement with either one of its associated bevel gears 176, resulting in lowering or raising of the elevator 79, depending on the direction in which the control lever 238 is rocked from its neutral position.

The control lever 240, which is turnable on the pivot stud 248 of the control lever 238, is interposed between the latter and the mounting plate 236 and straddles the upper, curved part of the mounting plate 236 in the manner shown in Fig. 15. The control lever 240 carries at its upper end a pivoted operating handle 270, and is provided with a slot 272, having a longitudinal portion 274 terminating at one end in an arcuate portion 276 which extends circularly about the axis of the pivot stud 248 (Fig. 14). The spring-pressed plunger 254 projects into the slot 272 at all times. When the plunger 254 extends through the arcuate portion 276 of the slot 272 in the control lever 240 and into the hole 256 in the mounting plate 236 (Fig. 15), the control lever 238 is locked to the mounting plate 236, but the control lever 240 may be rocked within limits defined by the arcuate portion 276 of the slot 272. The control lever 240 is connected with a link 278 which is also connected with one arm of a pivotally mounted bell-crank lever 280 (Fig. 9), the other arm of which is connected by a link 282 with the shift lever 196 (Fig. 9A). Hence, on rocking the control lever 240 from the neutral or inoperative position shown in full line in Fig. 14, the driving clutch element 190 (Fig. 9A) is shifted into engagement with either one of its associated bevel gears 178, with the result that the track extension unit 93 is opened or closed, depending on the direction in which the control lever 240 is rocked from its neutral position.

Figure 10:
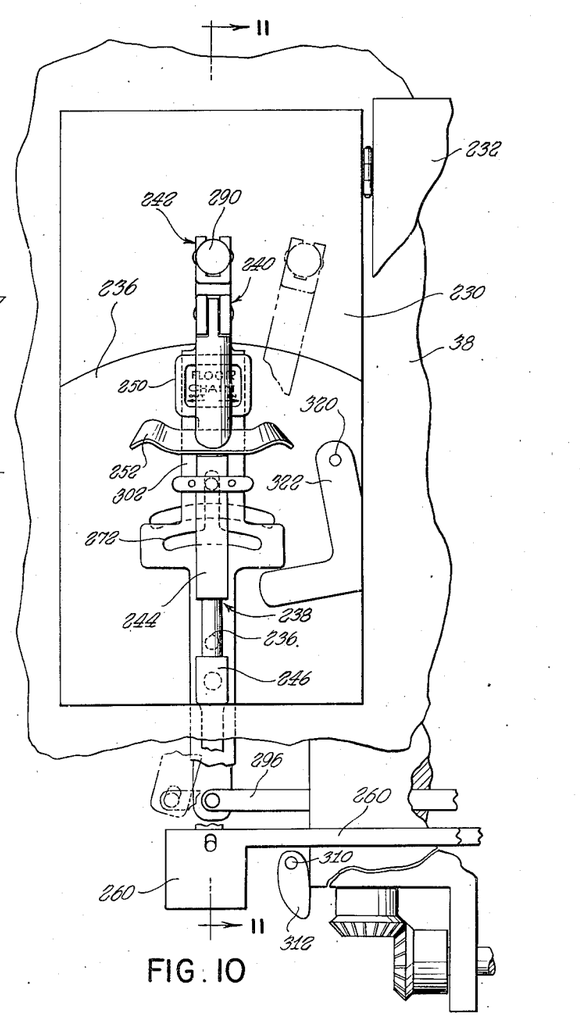
Fig. 10 is a front elevational view of certain control apparatus in a normally closed box in the body of the vehicle, as viewed in the direction of the arrow 10 in Fig. 8.

The control lever 242 is pivotally mounted at 284 on the mounting plate 236 (Fig. 11), and carries a spring-urged plunger 286 which normally projects into the hole 257 in the mounting plate 236 (Figs. 13 and 15) to lock the lever 242 in its neutral or inoperative position (Fig. 10). However, when the telescopic control lever 238 is extended sufficiently to align the spring-urged plunger 254 with the hole 257 in the mounting plate 236, the plunger 254, being under greater spring compression than the plunger 286, will enter the hole 257 and force the plunger 286 therefrom, whereby the control lever 242 is released from the mounting plate 236, while the control levers 238 and 240 are locked to said mounting plate. The control lever 242 carries at its upper end a pivoted operating handle 290, and is provided with a spring-urged ball 292 which is adapted to project into a depression 294 in the lever 240. More particularly, the spring-urged ball 292 serves yieldingly to arrest the control lever 242 in its neutral position when the same is released from the mounting plate 236 (Fig. 11) and the control levers 238, 240 are locked to said mounting plate. The lower end of the control lever 242 is connected with a link 296 which is also connected with one arm of a pivotally mounted bell crank lever 298 (Fig. 9), the other arm of which is connected by a link 300 with the shift lever 198 (Fig. 9A). Hence, on rocking the control lever 242 from the neutral or inoperative position shown in full lines in Fig. 10, the driving clutch element 192 (Fig. 9A) is shifted into engagement with either one of its associated bevel gears 180, resulting in operation of the chain conveyors 124 in either direction, depending on the direction in which the control lever 242 is rocked from its neutral position.

To facilitate the setting of the telescopic control lever 238 for aligning the plunger 254 thereon with either hole 256 or 257, or the slot 258, in the mounting plate 236, and thereby condition the various control levers 238, 240 and 242 for manipulation by the operator, the control lever 240 has inscribed in its front face 302 suitable directions such as indicated in Figs. 10, 12 and 14. Thus, when the operator of the truck wishes to open or close the track extension unit 93, he contracts the telescopic lever 238 until the words "Back door" and the arrows marked "Up" and "Down" appear in the window frame 250 (Fig. 14). The lever 240, which controls the opening and closing of the track extension unit 93, is then released from the mounting plate 236 and may be rocked, while the remaining control levers 238 and 242 are locked to the mounting plate 236 (Fig. 15). More particularly, the levers 238 and 242 are then locked to the mounting plate 236 by the plungers 254 and 286, respectively, but the lever 240 may be rocked because the plunger 245 extends through the arcuate portion 276 of the slot 272 (Figs. 14 and 15).

When the operator wishes to lower or raise the elevator 79 and the track extension unit 93 in unison, he extends the telescopic control lever 238 until the words "Elevator & Door interlocked" and the arrows marked "Up" and "Down" appear in the window frame 250 (Fig. 12). The levers 238 and 240, which control the power operation of the screws 80 and 102, respectively, are then released from the mounting plate 236, but are interlocked for joint rocking motion by the plunger 254, while the control lever 242 is locked to the mounting plate 236 by the plunger 286 (Fig. 13). More particularly, the plunger 254 in the lever 238 then extends through the longitudinal portion 274 of the slot 272 in the lever 240 and into the arcuate slot 258 in the mounting plate 236 (Figs. 12 and 13), while the plunger 286 in the lever 242 extends into the hole 257 in said mounting plate.

Figure 11:
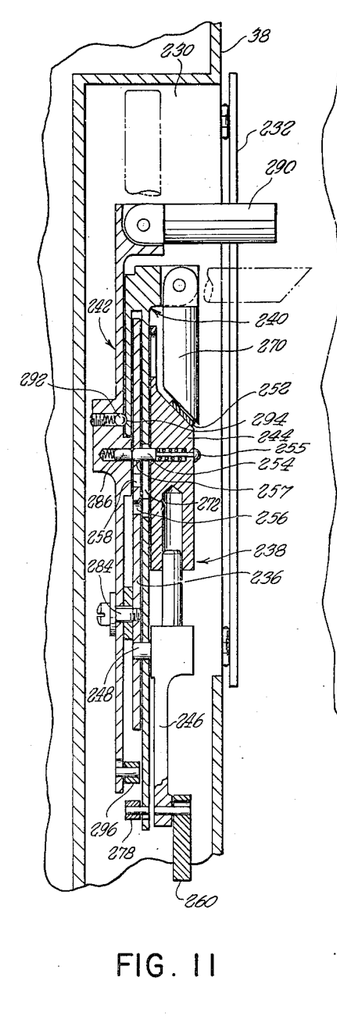
Fig. 11 is a section taken on the line 11—11 of Fig. 10.

To operate the chain conveyors 124, the operator further extends the telescopic control lever 238 until the words "Floor chain" and the arrows marked "In" and "Out" appear in the window frame 250 (Fig. 10). The lever 242, which controls the operation of the chain conveyors 124, is then released from the mounting plate 236 and may be rocked, while the other control levers 238 and 240 are locked to the mounting plate 236 (Fig. 11).

In order to permit the operator to withdraw the plunger 254 from either hole 256 or 257, or from the slot 258, in the mounting plate 236, so that he may set the telescopic lever 238 in the various positions mentioned, the plunger 254 is provided with a knob 255 which the operator may grasp. When the control levers 238, 240 and 242 are not in use, the control box 230 is closed by the cover 232, the handles 270 and 290 on the control levers 240 and 242 being first swung into the control box to permit closure of the same.

Provisions are also made automatically to stop the power drives for the screws 80 and 102 before parts thereof become jammed or damaged, should the operator fail to stop these power drives at the proper times.

Thus, there is pivoted to the truck body at 310 a cam lug 312 (Figs. 10, 12, 12A and 14), which has a depending arm 314 and normally assumes the position shown in Figs. 10 and 14. The tail gate 112, which opens and closes when the elevator 79 and the track extension unit 93 are lowered and raised, respectively, has a laterally projecting pin 316 which engages the arm 314 of the cam lug 312 and rocks the latter into the position shown in Fig. 12 when the tail gate 112 is being closed. When the cam lug 312 is thus rocked, it engages and shifts the enlarged end 260a of the link 260 into the position shown in full lines in Fig. 12, thereby returning the interlocked control levers 238 and 240 (Fig. 13) to neutral position (shown in full lines in Fig. 12) in which the power drives for the screws 80 and 102 are inoperative. Hence, if the operator fails to throw the interlocked control levers 238, 240 into neutral position when the elevator 79 and track extension unit 93 reach their uppermost position (Fig. 2), the cam lug 312 will throw these levers into neutral position, thereby automatically stopping the elevator 79 and track extension unit 93 in their uppermost position.

Suitably pivoted at 320 in the control box 230 is a camming lever 322 in form of a bell crank, which normally assumes the dot-and-dash line position shown in Fig. 14. In order to close the track extension unit 93, the operator throws the control lever 240 into the dot-and-dash line position shown in Fig. 14. When the track extension unit 93 is being closed, one of the travelers 100, while descending on its screw 102, rocks the lever 322 from the dot-and-dash line position into the full line position shown in Fig. 14, whereby said lever 322 returns the control lever 240 to neutral position, thereby automatically stopping the track extension unit 93 when the same is closed.

The camming lever 322 also locks the control levers 238 and 240 against movement into the dot-and-dash line position in Fig. 12 to effect joint lowering of the elevator 79 and the track extension unit 93, when the latter is closed, because the lever 322 remains in the full line position shown in Figs. 12 and 14 as long as the track extension unit 93 is closed.

Provisions are also made automatically to stop the elevator 79 and track extension unit 93 when, on lowering the same, packing cases suspended thereon reach the ground. To this end, a vertical ground gauge in form of a preferably square rod 330 is provided, which slides through, and is turnable in, a cylindrical hole 339 in a boss 340 on one of the bottom rails 58 (Figs. 9, 18 and 20). The cylindrical top end 332 of the gauge is slidably and rotatably received in a sleeve 334 (Figs. 18 and 19). The sleeve 334 is mounted in a member 336 which is in turn mounted on a boss 62 of one of the brackets 64 of the elevator 79 (see also Fig. 2). The top end of the gauge 330 carries a transverse pin 342 which rides in an oblique cam slot 344 in the sleeve 334 (Figs. 18 and 19), so that the gauge 330 turns when it is moved end-wise relative to the sleeve 334. Adjustably mounted on the gauge 330 is a collar 346, and interposed between the latter and the sleeve 334 is a compression spring 348 which urges the gauge into a lowermost position in which the follower pin 342 rests in the lowermost portion of the cam slot 344 (Fig. 18). The gauge 330 is also slidable through square holes 350 in collars 352 which turn with the gauge. The collars 352 have lateral lugs 354 which are floatingly pivotally connected at 356 with a push bar 358, having an arm 360 which lies in the rocking plane of the lower or pivoted section 246 of the control lever 238. The push bar 358 is suitably guided in the control box 230 for movement longitudinally of its arm 360 to and from the lever section 246 (Fig. 18). To lower the elevator 79 and track extension unit 93 for unloading packing cases from the truck onto the ground, the interlocked control levers 238 and 240 are thrown into the dot-and-dash line position shown in Fig. 12, in which the pivoted section 246 of the control lever 238 assumes the position shown in Fig. 18. Just before the packing cases 48 on the descending elevator 79 and track extension unit 93 reach the ground, the gauge 330 hits the ground (Fig. 3), whereupon the gauge is turned due to the interaction of the cam slot 344 in the sleeve 334 and the follower pin 342 on the gauge. The turning gauge 330 moves the push bar 358 so that its arm 360 advances in the direction of the arrow 362 (Fig. 18) and throws the control lever 238 and the interlocked control lever 240 into neutral position, thereby automatically stopping the descending elevator 79 and track extension unit 93 just when the packing cases thereon reach the ground. The mechanism just described is also of advantage when the truck is loaded from the ground, in that the descending elevator 79 and track extension unit 93 are automatically stopped at the proper level to receive packing cases on the ground, as will be readily understood.

The same mechanism is used automatically to stop the track extension unit 93 when the operator fails to stop the same in its opening movement on longitudinal alignment with the elevator 79. To this end, the push bar 358 carries an offset member 370 (Fig. 18) which is in operative alignment with the control lever 240 (Fig. 14), and the collar 346 on the gauge 330 has a laterally projecting cam lug 372 (see also Fig. 23) which is adapted to cooperate with a lateral cam lug 374 on one of the links 96 (Figs. 2 and 18). To cause opening of the track extension unit 93, the control lever 240 is thrown into the dotted line position shown in Fig. 14, in which the same is in close proximity to the member 370 on the push bar 358. So long as the track extension unit 93 is stopped in longitudinal alignment with the elevator 79 (Fig. 2), by manually throwing the control lever 240 into neutral position, the cam lug 374 on the link 96 remains below and out of contact with the cam lug 372 on the gauge 330. However, when the track extension is not thus stopped and swings beyond longitudinal alignment with the elevator 79, the cam lug 374 on the link 96 will engage the cam lug 372 on the gauge 330 and raise the same. Due to the interaction of the cam slot 344 and follower pin 342, the gauge 330 is then turned as it is raised, resulting in forward movement of the member 370 in the direction of the arrow 380 in Figs. 14 and 18, whereby the control lever 240 is returned to its neutral or inoperative position and the track extension unit 93 is automatically stopped shortly after it overswings its normally open position in which it is in longitudinal alignment with the elevator 79. To condition the gauge 330 for subsequent operation from the ground, the track extension unit 93 will, of course, have to be returned to its normally open position (in longitudinal alignment with the elevator 79) in order to permit the gauge 330 to drop to its normal, operative position (Fig. 18).

I claim:

1. In a vehicle for transporting merchandise carriers, a substantially horizontal track on which said carriers may be suspended for movement thereon, said track consisting of longitudinal sections of which an end section is vertically movable to and from alignment with the remainder of the track and is so disposed that a carrier thereon may be raised and lowered clear of the vehicle for transferring a carrier directly from the ground onto said track remainder, and vice versa, and means for moving said end section.

2. In a vehicle having a substantially horizontal track on which merchandise carriers may be suspended for movement thereon, a track extension vertically movable to and from longitudinal alignment with said track and so disposed that a carrier thereon may be raised and lowered clear of the vehicle for transferring a carrier directly from the ground onto said track, and vice versa, said track extension consisting of hingedly connected longitudinal sections of which the one section remote from said track is swingable to and from longitudinal alignment with the other section, means for moving said track extension, and means for swinging said one section.

3. In a vehicle having a substantially horizontal track on which merchandise carriers may be suspended for movement thereon, the combination of a track extension vertically movable to and from longitudinal alignment with said track and so disposed that a carrier thereon may be raised and lowered clear of the vehicle for transferring a carrier directly from the ground onto said track, and vice versa, said track extension consisting of hingedly connected longitudinal sections of which the one section remote from said track is swingable to and from longitudinal alignment with the other section, means for swinging said one section, and means including said swinging means for moving said track extension.

4. The combination in a vehicle as set forth in claim 3, in which said swinging means comprises a vertical rotary screw, a non-rotatable nut thereon, and a link connecting said nut with said one section, and said moving means comprises besides said swinging means another vertical rotary screw in threaded engagement with said other section.

5. In a vehicle having a body and a hinged tail gate thereon extending horizontally when closed and downwardly when open, a substantially horizontal track in said body on which merchandise carriers may be suspended for movement thereon, said track consisting of longitudinal sections of which an end section is vertically above the closed tail gate and is vertically movable to and from alignment with the remainder of the track, means connecting said end section and tail gate so that the latter is opened and closed on lowering and raising the former, respectively, and means for moving said end section.

6. In a vehicle having a body open at one side and a substantially horizontal track therein which extends with one end substantially to said open side and on which merchandise carriers may be movably suspended, a track extension pivoted to said one track end so as to be swingable about a horizontal axis into two different positions in one of which it is in longitudinal alignment with said track, a cover carried by said track extension to close the open side of said body when said track extension is in the other of said positions, and means for swinging said track extension.

7. In a vehicle, a body consisting of a top, bottom and sides, and provided with an opening in one side continuing part-way into the bottom, a tail gate hinged to said bottom and swingable to close and expose the opening in the latter, a substantially horizontal track in said body on which merchandise carriers may be suspended for movement thereon, a track extension vertically movable to and from longitudinal alignment with said track and consisting of hingedly connected longitudinal sections of which the one section remote from said track is swingable about a horizontal axis into two different positions in one of which it is in longitudinal alignment with the other section, and the latter is vertically above the closed tail gate and extends within the body substantially to the side opening thereof, a cover carried by said one section to close the side opening in the body when said one section is in the other of said positions, means for moving said track extension, means for swinging said one section, and means for opening and closing said tail gate.

8. In a vehicle, a vertically movable elevator, rotary means for moving said elevator in opposite directions on rotating said means in opposite directions, respectively, a reversible power drive for said rotary means, means including a movable handle for rendering said power drive operative in opposite directions on moving said handle from a neutral position in opposite directions, respectively, and for rendering said power drive inoperative on moving said handle into neutral position, and means including a member depending from, and vertically yieldingly carried by, said elevator for moving said handle into neutral position on vertical relative movement between said elevator and member when the latter reaches the ground on descending with the former.

9. In a vehicle having a substantially horizontal track on which identical merchandise carriers may be suspended for movement thereon, a track extension vertically movable to and from longitudinal alignment with said track and so disposed that a carrier thereon may be raised or lowered clear of the vehicle, rotary means for moving said track extension in opposite directions on rotating said means in opposite directions, respectively, a reversible power drive for said rotary means, means including a movable handle for rendering said power drive operative in opposite directions on moving said handle from a neutral position in opposite directions, respectively, and for rendering said power drive inoperative on moving said handle into neutral position, and means including a vertical rod depending from, and longitudinally yieldingly carried by, said track extension for moving said handle into neutral position on vertical relative movement between said track extension and rod when the latter reaches the ground on descending with the former, said rod extending slightly below a carrier on said track extension so that said carrier rests on the ground when said track extension is in its lowermost position.

10. In a vehicle having a substantially horizontal track on which merchandise carriers may move, the combination of a track extension hinged to one end of said track and swingable from a certain position into and beyond longitudinal alignment with said track, and vice versa, means including a rotary element for swinging said track extension in opposite directions on rotating said element in opposite directions, respectively, a reversible power drive for said element, means including a movable handle for rendering said power drive operative in opposite directions on moving said handle from a neutral position in opposite directions, respectively, and for rendering said power drive inoperative on moving said handle into neutral position, and means automatically moving said handle into neutral position when said track extension swings beyond longitudinal alignment with said track.

11. The combination in a vehicle as set forth in claim 10, further comprising means automatically moving said handle into neutral position when said track extension reaches said certain position.

12. In a vehicle having a substantially horizontal track on which merchandise carriers may be suspended for movement thereon, the combination of a track extension vertically movable to and from longitudinal alignment with said track and so disposed that a carrier thereon may be raised or lowered clear of the vehicle, said track extension consisting of hingedly connected longitudinal sections of which the one section remote from said track is swingable upwardly from a certain position into and beyond longitudinal alignment with the other section and downwardly into said certain position, means comprising a first vertical rotary screw, a non-rotatable nut thereon, and a link connecting said one section and nut, for swinging said one section in opposite directions on rotating said screw in opposite directions, respectively, a second vertical rotary screw in threaded engagement with said other section for vertically moving the latter in opposite directions on rotating said second screw in opposite directions, respectively, first and second reversible power drives for said first and second screws, respectively, first and second control devices, each including a movable member, for rendering said first and second power drives, respectively, operative in opposite directions on moving their respective members from a neutral position in opposite directions, respectively, and inoperative on moving their respective members into neutral position, a handle on the member of said first control device for moving the same to cause swinging movement of said one section, and means for releasably interlocking said members for joint movement to cause joint vertical movement of said sections.

13. The combination in a vehicle as set forth in claim 12 further comprising means automatically returning the member of said second control device to neutral position when said other section moves into longitudinal alignment with said track.

14. The combination in a vehicle as set forth in claim 12, further comprising means including an element depending from, and vertically yieldingly carried by, said other section for moving the member of said first control device into neutral position to stop upward swinging movement of said one section when said element yields, and said link engaging said element and causing it to yield when said one section swings beyond longitudinal alignment with said other section.

15. The combination in a vehicle as set forth in claim 12 further comprising means including a vertical rod depending from, and longitudinally yieldingly carried by, said other section and parts cooperating to turn said rod as it yields, for pushing the member of said second control device into neutral position when said rod yields on reaching the ground when descending with said other section, said rod having a lateral projection and normally assuming a position in which it extends slightly below a carrier on said other section so that said carrier rests on the ground when said other section is in its lowermost position, and means including said rod for pushing the member of said first control device into neutral position to stop upward swinging movement of said one section when said rod yields, and said link having a lateral lug engaging the lateral projection on said rod and causing the latter to yield when said one section swings beyond longitudinal alignment with said other section.

16. The combination in a vehicle as set forth in claim 12, further comprising a movable element engaged and moved by said nut to push the member of said first control device into neutral position when said one section swings into said certain position, whereby said element also prevents movement of said members, when interlocked, into position to cause joint descent of said sections while said one section is in said certain position.

17. In a vehicle having a substantially horizontal track on which merchandise carriers may move, the combination of a chain conveyor extending longitudinally of the track and carrying a lug to engage and move a carrier on the track, said lug having differently disposed surfaces for engaging and moving said carrier in opposite directions, respectively, and being pivotally mounted on said conveyor so as to be rockable into either one of two different operating positions in which said surfaces, respectively, are in operative relation with said carrier, a latch spring on said conveyor cooperating with said lug to permit limited rocking movement of the latter from, and return it to, either of its operating positions, and means to operate said conveyor in opposite directions.

18. In a vehicle for transporting merchandise carriers, a substantially horizontal track on which said carriers may be suspended for movement thereon, said track consisting of longitudinal sections of which one section is vertically movable to and from alignment with the remainder of the track and clear of the vehicle for transferring a carrier directly from the ground onto said track remainder, and vice versa, and means for moving said one section.

19. In a vehicle having a body open at one side and at the bottom adjacent said one side, a substantially horizontal track in said body on which merchandise carriers may be suspended for movement thereon, a track extension vertically movable to and from longitudinal alignment with said track and consisting of hingedly connected longitudinal sections of which the one section nearest said track is above the open bottom of the body and extends to said open side thereof, and the other section is swingable about a horizontal axis into different positions in one of which it is in longitudinal alignment with said one section, a cover carried by said other section to close said open side of the body when the latter section is in its other position, means for moving said track extension, and means for swinging said other section.

JACK PEARLMAN.

REFERENCES CITED

The following references are of record in the file of this patent:

UNITED STATES PATENTS

| Number | Name | Date |
| --- | --- | --- |
| 1,232,749 | Allen | July 10, 1917 |
| 1,628,880 | Heise | May 17, 1927 |
| 1,862,632 | Perin | June 14, 1932 |
| 1,883,538 | Bywater | Oct. 18, 1932 |
| 1,915,765 | Sharkey | June 27, 1933 |
| 1,977,655 | Troell | Oct. 23, 1934 |
| 2,035,355 | Weise | Mar. 24, 1936 |
| 2,045,566 | Berg | June 30, 1936 |
| 2,138,893 | Wallace | Dec. 6, 1938 |
| 2,146,436 | Lima | Feb. 7, 1939 |
| 2,235,727 | Pearlman | Mar. 18, 1941 |
| 2,266,791 | Norbom | Dec. 23, 1941 |
| 2,301,639 | Onstott | Nov. 10, 1942 |
| 2,421,128 | Pride | May 27, 1947 |

FOREIGN PATENTS

| Number | Country | Date |
| --- | --- | --- |
| 726,413 | France | Mar. 1, 1932 |